(12) United States Patent
Moore et al.

(10) Patent No.: US 7,984,193 B2
(45) Date of Patent: Jul. 19, 2011

(54) METHOD AND SYSTEM FOR CONSERVING POWER BY DEGRADING NETWORK CONNECTION SPEED

(75) Inventors: William H. Moore, Fremont, CA (US); Darrin P. Johnson, San Jose, CA (US); Randall S. Fishel, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 449 days.

(21) Appl. No.: 11/863,179

(22) Filed: Sep. 27, 2007

(65) Prior Publication Data
US 2009/0086650 A1   Apr. 2, 2009

(51) Int. Cl.
*G06F 15/16* (2006.01)
(52) U.S. Cl. ...................................................... 709/250
(58) Field of Classification Search .................. 709/250; 370/252
See application file for complete search history.

(56) References Cited

U.S. PATENT DOCUMENTS

| | | | |
|---|---|---|---|
| 6,529,957 B1 * | 3/2003 | Joergensen | 709/233 |
| 6,732,190 B1 * | 5/2004 | Williams et al. | 709/250 |
| 6,795,450 B1 * | 9/2004 | Mills et al. | 370/463 |
| 7,227,847 B2 * | 6/2007 | Gluck | 370/311 |
| 7,363,375 B2 * | 4/2008 | Qiu et al. | 709/226 |
| 2002/0196736 A1 * | 12/2002 | Jin | 370/229 |
| 2003/0191854 A1 * | 10/2003 | Hsu et al. | 709/233 |
| 2003/0221026 A1 * | 11/2003 | Newman | 710/8 |
| 2004/0257989 A1 * | 12/2004 | Lingafelt et al. | 370/230 |
| 2006/0222002 A1 * | 10/2006 | Basso et al. | 370/465 |
| 2006/0285494 A1 * | 12/2006 | Li et al. | 370/235 |
| 2008/0307078 A1 * | 12/2008 | McDaniel et al. | 709/222 |

* cited by examiner

*Primary Examiner* — Andrew Caldwell
*Assistant Examiner* — Loi Tran
(74) *Attorney, Agent, or Firm* — Osha • Liang LLP

(57) ABSTRACT

In general, in one aspect, the invention relates to a method for conserving power. The method includes determining a first network connection speed for a network interface card (NIC), configuring the NIC to operate at the first network connection speed, processing, after the configuration, packets received by the NIC, obtaining a bandwidth utilization of the NIC, determining, using a power management policy, a second network connection speed for the NIC based on the bandwidth utilization when the bandwidth utilization is outside a threshold range, and configuring the NIC to operate at the second network connection speed.

17 Claims, 3 Drawing Sheets

METHOD AND SYSTEM FOR CONSERVING POWER BY DEGRADING NETWORK CONNECTION SPEED

CROSS-REFERENCE TO RELATED APPLICATIONS

The instant application is related to U.S. patent application Ser. No. 11/286,085 filed on Nov. 22, 2005, which is assigned to the same assignee as the instant application and is hereby incorporated by reference.

BACKGROUND

A modern computer system may be divided roughly into three conceptual elements: the hardware, the operating system, and the application programs. The hardware, e.g., the central processing unit (CPU), the memory, the persistent storage devices, and the input/output devices, provides the basic computing resources. The application programs, such as compilers, database systems, software, and business programs, define the ways in which these resources are used to solve the computing problems of the users. The users may include people, machines, and other computers that use the application programs, which in turn, employ the hardware to solve numerous types of problems.

An operating system ("OS") is a program that acts as an intermediary between a user of a computer system and the computer hardware. The purpose of an operating system is to provide an environment in which a user can execute application programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary. Because there may be many, possibly conflicting, requests for resources, the operating system must decide which requests are allocated resources to operate the computer system efficiently and fairly.

Moreover, an operating system may be characterized as a control program. The control program controls the execution of user programs to prevent errors and improper use of the computer. It is especially concerned with the operation of I/O devices. In general, operating systems exist because they are a reasonable way to solve the problem of creating a usable computing system. The fundamental goal of a computer system is to execute user programs and make solving user problems easier. Toward this goal, computer hardware is constructed. Because bare hardware alone is not particularly easy to use, application programs are developed. These various programs require certain common operations, such as those controlling the I/O operations. The common functions of controlling and allocating resources are then brought together into one piece of software: the operating system.

In order to conserve energy, some computer systems incorporate power control mechanisms. For example, Energy Star ("E*") power requirements require system power consumption to be lowered to 15% of the normal operating power consumption level when the system is idle. In order to conserve power, the operating system turns off (or lowers the operating frequencies of) inactive devices, such as hard disks and monitors. The operating system may also conserve power by adjusting the execution of the CPU.

SUMMARY

In general, in one aspect, the invention relates to a method for conserving power. The method includes determining a first network connection speed for a network interface card (NIC), configuring the NIC to operate at the first network connection speed, processing, after the configuration, packets received by the NIC, obtaining a bandwidth utilization of the NIC, determining, using a power management policy, a second network connection speed for the NIC based on the bandwidth utilization when the bandwidth utilization is outside a threshold range, and configuring the NIC to operate at the second network connection speed.

In general, in one aspect, the invention relates to a system. The system relates to a network interface card (NIC) configured to receive packets from a network, a network statistics module configured to determine bandwidth utilization of the NIC and a policy engine configured to determine a first network connection speed for a network interface card (NIC), obtain the bandwidth utilization of the NIC from the network statistics module, determine, using a power management policy, a second network connection speed for the NIC based on the bandwidth utilization when the bandwidth utilization is outside a threshold range, and initiate the configuration of the NIC to operate at the second network connection speed.

In general, in one aspect, the invention relates to a computer readable medium comprising computer readable program code embodied therein for causing a computer system to determine a first network connection speed for a network interface card (NIC), configure the NIC to operate at the first network connection speed, process, after the configuration, packets received by the NIC, obtain a bandwidth utilization of the NIC, determine, using a power management policy, a second network connection speed for the NIC based on the bandwidth utilization when the bandwidth utilization is outside a threshold range, and configure the NIC to operate at the second network connection speed.

Other aspects of the invention will be apparent from the following description and the appended claims.

DETAILED DESCRIPTION

Figure 1:
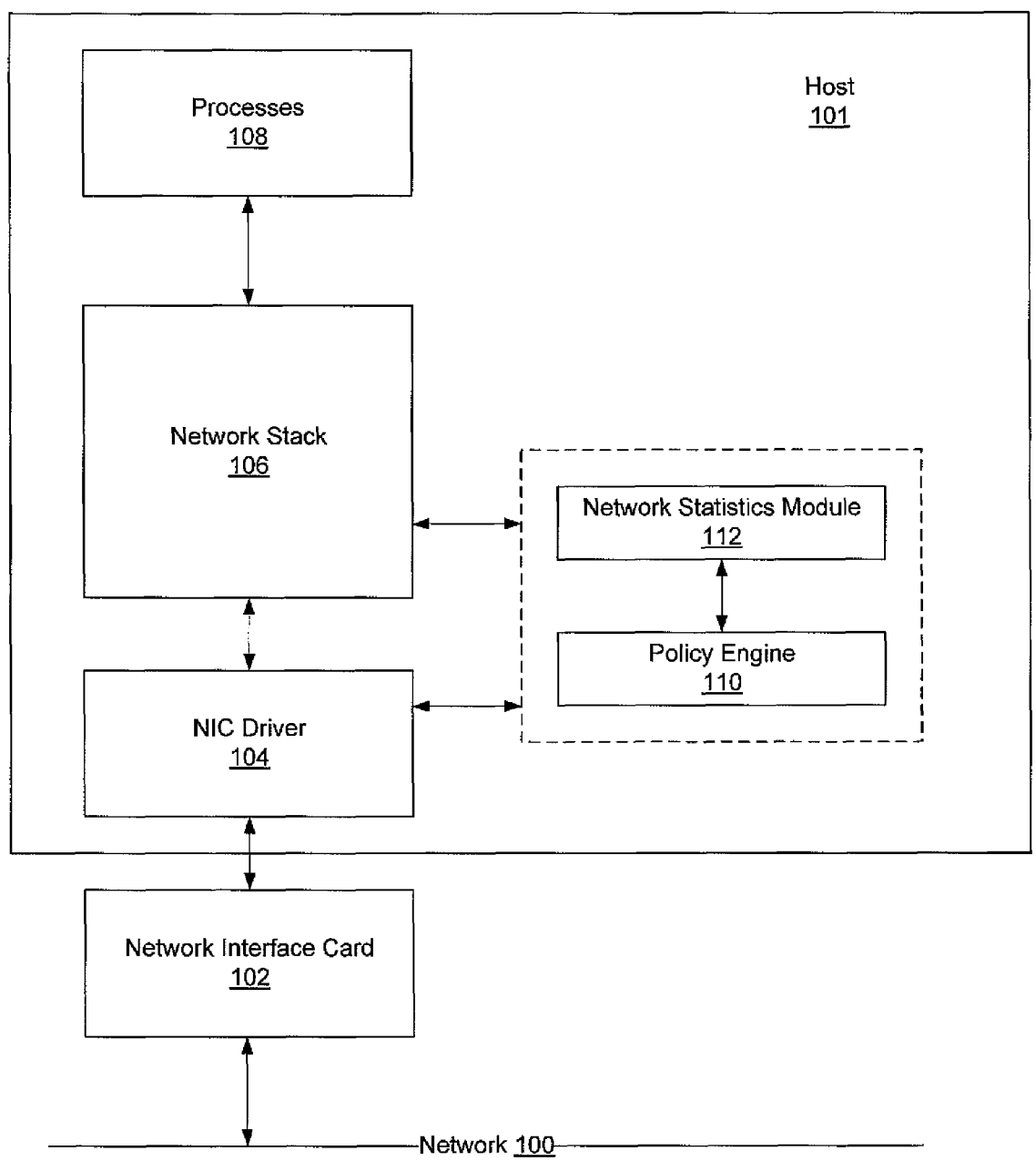
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for conserving power by degrading network connection speed. More specifically, embodiments of the invention relate to method and system for adjusting power consumption of a network interface card (NIC) by adjusting the network connection speed of the NIC. The ability to adjust the power consumption of the NIC allows for power management, which may result in decreased power consumption.

Further, the invention provides functionality to monitor the bandwidth utilization of the NIC and adjust the network connection speed appropriately. This allows the NIC to provide the necessary amount of bandwidth while not providing additional excess bandwidth. The minimization of excess bandwidth results in a decrease in power consumption of the NIC.

FIG. 1 shows a system in accordance with one or more embodiments of the invention. The system includes a host (101) operatively connected to a network interface card (NIC) (102). The NIC (102) provides an interface between a network (100) and the host (101). In one embodiment of the invention, the network may be a wide area network (WAN), a metropolitan area network (MAN), a local area network (LAN), a public network (such as the Internet or World Wide Web), a wireless network, a telephony network, a mobile telephony network, or any combination thereof. Further, the network (100) may include one or more networks interconnected by other network types (e.g., distinct LANs connected by one or more WANs).

In one embodiment of the invention, the host (101) is configured to send packets to the network (100) and to receive packets from the network (100). In both cases, the packets are processes by various components within the host (101). Specifically, the host (101) includes a NIC driver (104), a network stack (106), and processes (108). The host (101) further includes a network statistics module (112) and a policy engine (110). Each of these components is described below.

In one embodiment of the invention, the NIC driver (104) provides an interface between the NIC (102) and the other components on the host (101). The NIC driver (104) includes functionality to receive packets from the NIC (102) (or more specifically, from specific buffers (not shown) in the NIC (102)). Further, the NIC driver (104) includes functionality to send packets to the NIC (102) (or more specifically, place packets in specific buffers (not shown) in the NIC (102)). The NIC driver (104) also includes an interface to allow the host (101) (or more specifically, a process executing thereon (e.g., processes (108), processes executing in the policy engine (110)) configured to NIC (102). Configuring the NIC (102) may include, but is not limited to, enabling on NIC functionally to record bandwidth utilization characteristics (e.g., packets received, packets dropped) and adjusting the network connection speed (discussed below in FIG. 2).

Continuing with the discussion of FIG. 1, packets received by the NIC driver (104) from the NIC (102) are sent to the network stack (106). In one embodiment of the invention, the network stack (106) includes functionality to process the packets received from the network (100) in accordance with one or more protocols. In one embodiment of the invention, the network stack (106) supports Internet Protocol (IP) processing (including IPv4 and IPv6), Transmission Control Protocol (TCP) processing, and User Datagram Processing (UDP). The network stack (106) may also support any other network layer, transport layer, and application layer protocols.

Once the packets have been processed by the appropriate protocols in the network stack (106), the packets are forwarded to the processes (108). In one embodiment of the invention, the processes (108) may be operating system processes. Alternatively, the processes (108) may be user-level application processes.

When a process (108) sends a packet to the network (100), the packet must pass through the network stack (106), NIC driver (104), and NIC (102) prior to reaching the network (100). Each of the above components processes the packet, as necessary, before sending the packet to the next component.

Continuing with the discussion of FIG. 1, the host includes a network statistics module (112) and a policy engine (110). In one embodiment of the invention, the network statistics module (112) is configured to obtain bandwidth utilization characteristics from the various components in the host (101) as well as from the NIC (102) to determine anticipated bandwidth utilization and current bandwidth utilization.

In one embodiment of the invention, the network statistics module (112), via the NIC driver (104), may obtain bandwidth utilization characteristics from the NIC (102). The bandwidth utilization characteristics from the NIC (102) provide incoming bandwidth utilization (i.e., information about the number of packets received by the NIC (102), number of packets dropped by the NIC (102), etc.). In addition, the bandwidth utilization characteristics from the NIC (102) provide outgoing bandwidth utilization (i.e., the number of packets sent to the network (100) from the NIC (102)).

In addition, the network statistics module (112) may also obtain bandwidth utilization characteristics from the network stack (106). The network stack (106) may provide outgoing bandwidth information, which specifies the number of packets the network stack receives from the processes (108). In addition, the network stack (106) may also include information about the time elapsed between receiving the packets from the processes (108) to the packets being sent to the NIC driver (104). The information about the elapsed time may be important in determining whether there is sufficient outgoing bandwidth on the host (101).

Figure 2:
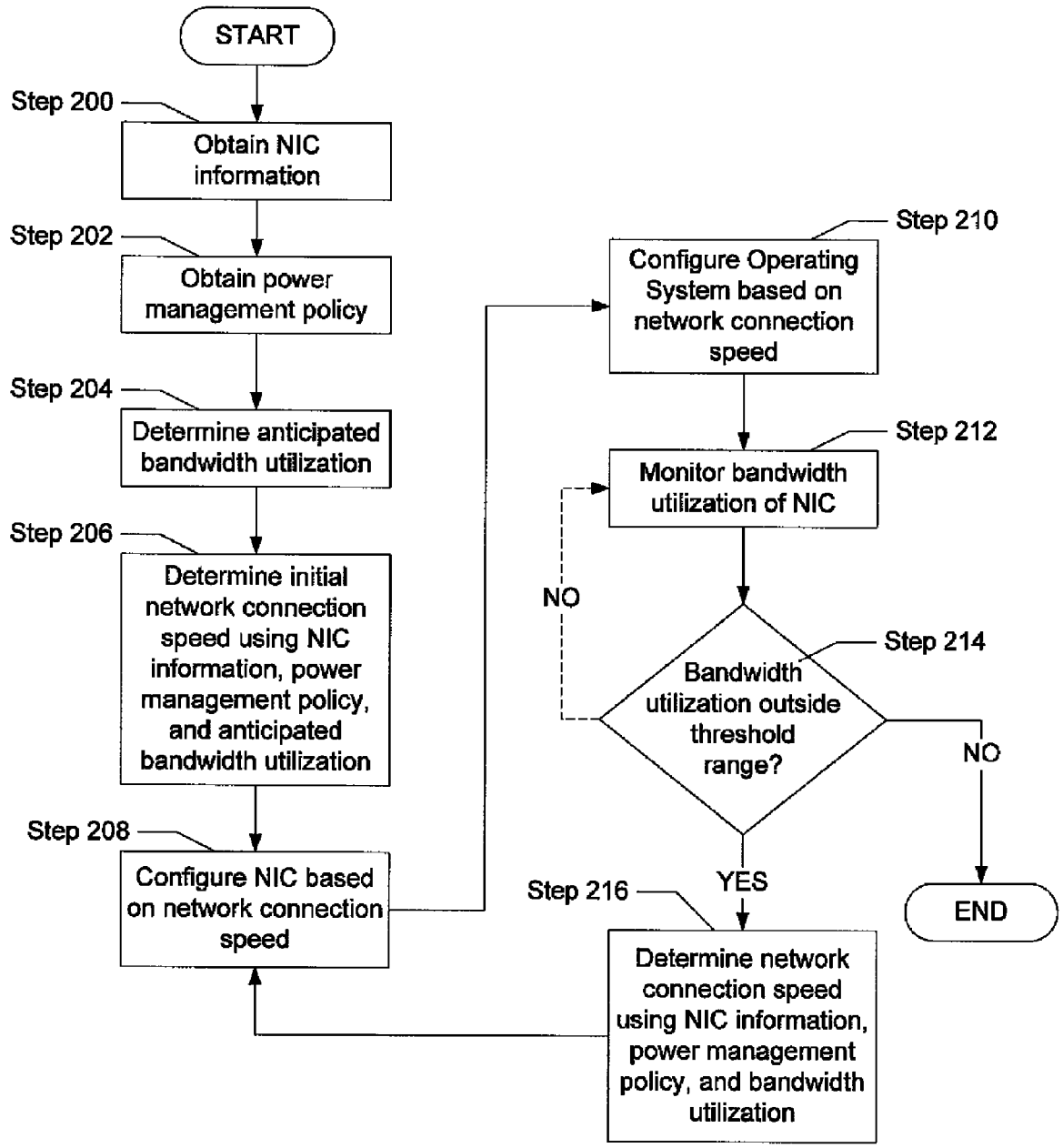
FIG. 2 shows a flow chart in accordance with one or more embodiments of the invention.

In one embodiment of the invention, the policy engine (110) is configured to determine the network connection speed of the NIC (102) (see FIG. 2). The policy engine (110) uses various sources of input to determine the network connection speed of the NIC (102). For example, the policy engine (110) may use information about the bandwidth utilization from the network statistics module (112), a power management policy, and NIC information.

In one embodiment of the invention, the power management policy defines a maximum power consumption of the NIC (102) and a time of day when the power management policy is in effect. More specifically, the power management policy may specify the number of kilowatt-hours (kWh) the NIC (102) may consume during a specific portion of the day. For example, the power management policy may indicate that the NIC may consume no more than 0.002 kWh during the hours 6:00 pm-6:00 am and consume no more than 0.004 kWh during the hours of 6:01 am-5:59 pm.

In one embodiment of the invention, the policy engine (110) may include a number of different power management policies. For example, the policy engine (110) may include a power management policy that is applied when power conservation is more important than network connection speed. In such cases, the power management policy may specify a maximum power consumption of the NIC (that is less than the power consumption of the NIC at the highest network connection speed the NIC supports), which may not be exceeded regardless of bandwidth utilization requirements. The policy engine (110) may also include a power management policy that is applied when network connection speed is more important than power conservation. In such cases, the power management policy may not include a maximum power consumption for the NIC (or the maximum power consumption is set at or above the power consumption of the NIC at the highest network connection speed the NIC supports).

In one embodiment of the invention, the NIC information defines the network connection speeds supported by the NIC (102). For example, the NIC (102) may be a 10 gigabit network card and support the following network connection speeds: (i) 10 gigabit/s Full Duplex; (ii) 10 gigabit/s Half Duplex; (iii) 1 gigabit/s Full Duplex; (iv) 1 gigabit/s Half Duplex; (v) 100 megabit/s Full Duplex; (vi) 100 megabit/s Half Duplex; (vii) 10 megabit/s Full Duplex; (viii) 10 megabit/s Half Duplex; (ix) 1 megabit/s Full Duplex; and (x) 1 megabit/s Half Duplex. In one embodiment of the invention, the granularity of the network connection speeds supported by the NIC may be larger or smaller than the granularity of the network connection speeds in the above example. In one embodiment of the invention, the NIC information may also define the power consumption of the NIC (102) at each network connection speed. Alternatively, the NIC information may include a formula (or other information) to enable the policy engine (110) to determine the power consumption of the NIC (102) at each network connection speed.

In one embodiment of the invention, the network statistics module (112) and the policy engine (110) are located in the same software layer as the NIC driver (102) (i.e., data link layer in the Open Systems Interconnection Basic Reference Model or the data link layer in the Internet Reference Model). Alternatively, the network statistics module (112) and the policy engine (110) may be located at other software layers within the host (101). For example, the network statistics module (112) may be located in the data link layer and the policy engine (110) may be located in the application layer (as defined by the Open Systems Interconnection Basic Reference Model or the Internet Reference Model).

FIG. 2 shows a flow chart in accordance with one or more embodiments of the invention. While the various steps in this flowchart are presented and described sequentially, one of ordinary skill will appreciate that some or all of the steps may be executed in different orders and some or all of the steps may be executed in parallel.

In Step 200, NIC information is obtained. In embodiment of the invention, the NIC information may be obtained by querying the NIC, querying the NIC driver, or from another source. In Step 202, the power management policy is obtained. In one embodiment of the invention, Step 202 may include selecting the appropriate power management policy to apply, if more than one power management policy exists. Alternatively, Step 202 may include accessing the power management policy, if only one power management policy exists.

In Step 204, the anticipated bandwidth utilization is determined. In one embodiment of the invention, the anticipated bandwidth utilization may be determined using historical bandwidth utilization obtained from the network statistics module. Alternatively, the anticipated bandwidth utilization may be a default value.

In Step 206, the initial network connection speed is determined using the NIC information, the power management policy, and the anticipated bandwidth utilization. In one embodiment of the invention, the anticipated bandwidth and NIC information are used to determined a proposed initial network connection speed. For example, if the anticipated bandwidth is 0.25 gigabits/s and the NIC information indicates that the NIC supports network connection speeds of 1 megabit/s, 10 megabits/s, 100 megabits/s and 1 gigabit/s, then the proposed initial network connection speed may be 1 gigabit/s. The power management policy is subsequently used to determine whether the proposed initial network connection speed satisfies the maximum power consumption for the NIC defined in power management policy. If the power consumption of the NIC at 1 gigabit/s exceeds the maximum power consumption, then the proposed initial network connection speed may be reduced to 100 megabits/s. The power consumption of the NIC at 100 megabits/s is determined using the NIC information and then compared to the maximum power consumption defined in the power management policy. In this example, the power consumption of the NIC at 100 megabits/s is less than the maximum power consumption defined in the power management policy. Thus, 100 megabits/s is set at the initial network connection speed.

If the power consumption of the NIC at 100 megabits/s was not less than the maximum power consumption defined in the power management policy, then the proposed initial network connection speed may be reduced to 10 megabits/s and the above process repeated until the maximum power consumption defined in the power management policy was satisfied.

In Step 208, the NIC is configured using the network connection speed specified in Step 206 (or Step 216 if the process reaches Step 208 from Step 216). In Step 210, the operating system may also be configured, as necessary, based on the network connection speed used in Step 208. In one embodiment of the invention, if the NIC (102) and host (101) support bandwidth control on a per-connection basis, then various components in the NIC (102) and host (101) may be configured (or re-configured) such that the bandwidth allocations to the various connections is proportionally adjusted in view of the network connection speed. U.S. patent application Ser. Nos. 11/112,367, 11/112,322, and 11/480,000 define various methods and systems for enforcing bandwidth control on a per-connection basis. The aforementioned U.S. patent applications are assigned to the same assignee as the instant application and are hereby incorporated by reference.

In Step 212, the bandwidth utilization of the host (101) is monitored using the mechanisms discussed above. In Step 214, a determination is made about whether the bandwidth utilization is outside a threshold range. For example, if the network connection speed is 10 megabits/s with a threshold range of +5 megabits/s and the bandwidth utilization is determined to be 11 megabits/s, then the bandwidth utilization is not outside the threshold range.

In one embodiment of the invention, the threshold range is defined globally for all network connection speeds or defined on a per-network connection speed basis. Further, the threshold ranges may be determined by the host (101) (or a user using the host (101)).

If the bandwidth utilization is not outside the threshold range, then the process ends or may proceed back to Step 212. If the bandwidth utilization is outside the threshold range, then in Step 216 the network connection speed is determined using the NIC information, the power management policy, and the bandwidth utilization (obtained in Step 214). Step 216 uses the same methodology as Step 206 defined above. Once the network connection speed is determined, the process proceeds to Step 208.

Figure 3:
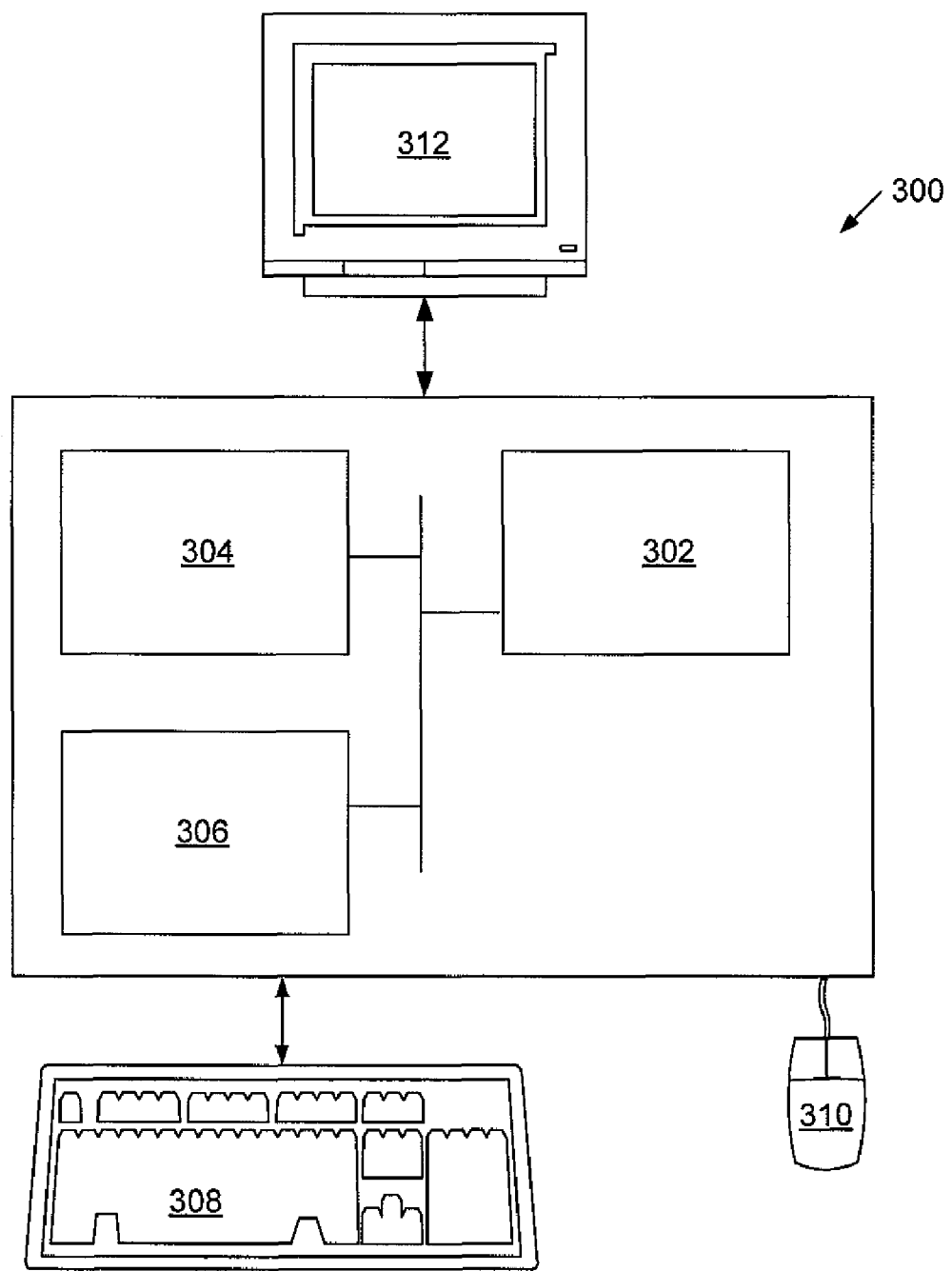
FIG. 3 shows a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., policy engine, processes) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for conserving power comprising:
    determining a first network connection speed for a network interface card (NIC);
    configuring the NIC to operate at the first network connection speed;
    processing, after the configuration, packets received by the NIC;
    obtaining a bandwidth utilization of the NIC;
    upon determining that the bandwidth utilization of the NIC is outside a threshold range:
        determining a power management policy in effect for the NIC, wherein the power management policy is one of a plurality of power management policies, and wherein each of the plurality of power management policies defines a maximum power consumption allowed for the NIC,
        determining, based on the power management policy in effect for the NIC, a maximum power consumption level for the NIC,
        determining a second network connection speed for the NIC based on the bandwidth utilization and NIC information,
        determining, using the NIC information, a power consumption level for the second network connection speed, and
        configuring the NIC to operate at the second network connection speed if the power consumption level for the second network connection speed does not exceed the maximum power consumption level for the NIC,
    wherein the bandwidth utilization measures a number of bits received by the NIC per unit of time, and
    wherein the NIC information defines a plurality of network connection speeds at which the NIC may be configured and a power consumption for each of the plurality of network connection speeds.

2. The method of claim 1, wherein the second connection speed is less than the first connection speed.

3. The method of claim 1, wherein the first network connection speed is selected based on NIC information, the power management policy, and an anticipated bandwidth utilization of the NIC.

4. The method of claim 1, wherein the power management policy further defines a time of day when the power management policy is in effect.

5. The method of claim 1, wherein the second connection speed is greater than the first connection speed.

6. The method of claim 1, wherein the threshold range defines a maximum number of packets that may be dropped over a period of time and a minimum number of packets that must be received over the period of time.

7. The method of claim 1, wherein the threshold range is defined globally for all network speeds.

8. The method of claim 1, wherein the threshold range is defined on a per-connection basis.

9. A system, comprising:
    a network interface card (NIC) configured to receive packets from a network;
    a network statistics module configured to determine bandwidth utilization of the NIC; and
    a policy engine configured to:
        determine a first network connection speed for a network interface card (NIC);
        obtain the bandwidth utilization of the NIC from the network statistics module;
        upon determining that the bandwidth utilization of the NIC is outside a threshold range:
            determine a power management policy in effect for the NIC, wherein the bower management r management policies, and wherein each of the plurality of power management policies defines a maximum power consumption allowed for the NIC,
            determine, based on the power management policy in effect for the NIC, a maximum power consumption level for the NIC,
            determine a second network connection speed for the NIC based on the bandwidth utilization and NIC information,
            determine, using the NIC information, a power consumption level for the second network connection speed, and
            configure the NIC to operate at the second network connection speed if the power consumption level for the second network connection speed does not exceed the maximum power consumption level for the NIC,
    wherein the bandwidth utilization measures a number of bits received by the NIC per unit of time, and
    wherein the NIC information defines a plurality of network connection speeds at which the NIC may be configured and a power consumption for each of the plurality of network connection speeds.

10. The system of claim 9, wherein the second connection speed is less than the first connection speed.

11. The system of claim 9, wherein the policy engine is further configured to select the first network connection speed based on NIC information, the power management policy, and an anticipated bandwidth utilization of the NIC.

12. The system of claim 9, wherein the threshold range defines a maximum number of packets that may be dropped over a period of time and a minimum number of packets that must be received over the period of time.

13. A non-transitory computer readable medium comprising computer readable program code embodied therein for causing a computer system to:
    determine a first network connection speed for a network interface card (NIC);
    configure the NIC to operate at the first network connection speed;
    process, after the configuration, packets received by the NIC;
    obtain a bandwidth utilization of the NIC;
    upon determining that the bandwidth utilization of the NIC is outside a threshold range:

determine a power management policy in effect for the NIC, wherein the power management policy is one of a plurality of power management policies, and wherein each of the plurality of power management policies defines a maximum power consumption allowed for the NIC, determine, based on the power management policy in effect for the NIC, a maximum power consumption level for the NIC, determine a second network connection speed for the NIC based on the bandwidth utilization and NIC information, determine, using the NIC information, a power consumption level for the second network connection speed, and configure the NIC to operate at the second network connection speed if the power consumption level for the second network connection speed does not exceed the maximum power consumption level for the NIC, wherein the bandwidth utilization measures a number of bits received by the NIC per unit of time, wherein the NIC information defines a plurality of network connection speeds at which the NIC may be configured and a power consumption for each of the plurality of network connection speeds.

14. The non-transitory computer readable medium of claim 13, wherein the first network connection speed is selected based on NIC information, the power management policy, and an anticipated bandwidth utilization of the NIC.

15. The non-transitory computer readable medium of claim 13, wherein the power management policy also defines a time of day when the power management policy is in effect.

16. The non-transitory computer readable medium of claim 13, wherein the threshold range is defined globally for all network speeds.

17. The non-transitory computer readable medium of claim 13, wherein the threshold range is defined on a per-connection basis.

\* \* \* \* \*

UNITED STATES PATENT AND TRADEMARK OFFICE
CERTIFICATE OF CORRECTION

| | | |
|---|---|---|
| PATENT NO. | : 7,984,193 B2 | Page 1 of 1 |
| APPLICATION NO. | : 11/863179 | |
| DATED | : July 19, 2011 | |
| INVENTOR(S) | : William H. Moore et al. | |

It is certified that error appears in the above-identified patent and that said Letters Patent is hereby corrected as shown below:

In claim 9, column 8, line 22, the word "bower" should read --power--.

In claim 9, column 8, line 22, the letter "r" should read --policy is one of a plurality of power--.

Signed and Sealed this

Thirteenth Day of September, 2011

David J. Kappos
*Director of the United States Patent and Trademark Office*